United States Patent
Langworthy et al.

(10) Patent No.: US 6,470,663 B2
(45) Date of Patent: Oct. 29, 2002

(54) REAR DISCHARGE ROTARY CUTTING DECK FOR MOWER

(75) Inventors: Thomas F. Langworthy, Belle Plaine, MN (US); Gerald J. Pomerening, Farmington, MN (US); Daniel M. Treu, Eagan, MN (US)

(73) Assignee: The Toro Company, Minneapolis, MN (US)

( * ) Notice: Subject to any disclaimer, the term of this patent is extended or adjusted under 35 U.S.C. 154(b) by 0 days.

(21) Appl. No.: 09/777,618

(22) Filed: Feb. 6, 2001

(65) Prior Publication Data

US 2002/0104301 A1 Aug. 8, 2002

(51) Int. Cl.[7] .............................................. A01D 34/64
(52) U.S. Cl. .................................................. 56/320.2
(58) Field of Search .............................. 56/17.5, 320.1, 56/321.2, 13.3, 13.4–13.8, 202, DIG. 9, DIG. 22, 16.7, 255, 295

(56) References Cited

U.S. PATENT DOCUMENTS

| | | | |
|---|---|---|---|
| 3,543,490 A | * 12/1970 | Erickson | |
| 4,099,366 A | * 7/1978 | Peterson | 56/13.6 |
| 4,189,903 A | * 2/1980 | Jackson et al. | 56/255 |
| 4,226,074 A | * 10/1980 | Mullet et al. | 56/320.2 |
| 5,117,616 A | * 6/1992 | McLane | 56/17.5 |
| 5,133,176 A | * 7/1992 | Baumann et al. | 56/17.4 |
| 5,267,429 A | * 12/1993 | Kettler et al. | 56/295 |
| 5,488,821 A | * 2/1996 | McCunn et al. | 56/320.2 |
| 5,765,346 A | * 6/1998 | Benter et al. | 56/2 |
| 6,038,840 A | * 3/2000 | Ishimori et al. | 56/13.3 |

* cited by examiner

*Primary Examiner*—Robert E. Pezzuto
(74) *Attorney, Agent, or Firm*—James W. Miller

(57) ABSTRACT

A rotary cutting deck has a rear grass discharge outlet formed by a cut-away portion of the peripheral wall of the cutting chamber located in one or more rear quadrants of the cutting chamber. An annular grass discharge channel is formed between an inner concentric shroud and the peripheral wall of the cutting chamber with the rear grass discharge outlet opening into this channel. A grass deflecting ramp is located within the grass discharge channel with a front end of the ramp located in advance of the entrance to the rear grass discharge outlet and a rear end of the ramp located in one of the rear quadrants of the cutting chamber to be adjacent some portion of the rear discharge outlet. The grass deflecting ramp progressively lowers between its front and rear ends to deflect grass clippings generally downwardly towards the rear discharge outlet. The ramp can have a downwardly extending divider vane to promote more even side-to-side distribution of the grass clippings. A horizontal baffle can be provided on the lower edge of the peripheral wall of the cutting chamber in advance of the rear grass discharge outlet to minimize side streaking or dribbling of grass clippings.

21 Claims, 6 Drawing Sheets

REAR DISCHARGE ROTARY CUTTING DECK FOR MOWER

TECHNICAL FIELD

This invention relates to a rotary cutting deck, namely to a cutting deck having at least one cutting blade that rotates in a substantially horizontal cutting plane, for use as part of a mower for cutting grass. More particularly, this invention relates to a cutting deck which discharges the grass clippings to the rear of the deck when the deck is configured in a grass discharge mode.

BACKGROUND OF THE INVENTION

Mowers are known for mowing large areas of grass, such as those in parks, golf courses, athletic fields, and the like. Many such mowers comprise a self-propelled traction frame that is part of a vehicle on which the operator sits as the mower is operated. At least one cutting deck, and often a plurality of cutting decks, are attached to the traction frame to cut a swath of grass as the traction frame moves forwardly. These cutting decks are usually attached to the traction frame by various known suspensions or linkages that permit the cutting decks to float relative to the ground so that the cutting decks follow or adjust to the contours of the ground as they pass over the ground.

Rotary cutting decks are often used as the cutting decks in mowers of this type. Rotary cutting decks are so named not because the decks themselves rotate in circles, but because the decks house one or more rotary cutting blades that rotate in circles in substantially horizontal cutting planes. Single spindled decks are known in which a single cutting blade is contained within each cutting deck. Thus, when a mower is equipped with a plurality of single spindled decks, each individual deck will be ground following and will contain a single rotary cutting blade, the decks being staggered and overlapped with one another so that all the decks collectively cut a single swath of grass.

As grass is cut by a given rotary cutting deck, grass clippings are generated which are eventually deposited onto the ground, assuming they are not first collected in some type of grass bagging attachment. Some rotary cutting decks are designed specifically as mulching decks in which the grass clippings fall or are driven out of the deck in a generally downward direction through an open bottom face of the deck. Some mulching decks of this type carry various baffles or deflectors which extend downwardly from the top wall of the deck into the flow of the grass clippings circulating within the deck to assist or speed in the downward movement of the grass clippings out of the mulching deck. U.S. Pat. No. 5,133,176 to Baumann et al., assigned to The Toro Company, the assignee of this invention, shows a mulching deck of this type.

Dedicated mulching decks, namely decks which only mulch by confining the grass clippings within the cutting deck until they exit through the open bottom of the cutting deck, do not permit the side or rear discharge of the grass clippings. Some operators of equipment of this type prefer mowers which also have the ability to discharge the grass clippings in a generally horizontal path through or beneath the peripheral wall of the cutting deck as opposed to having the clippings be driven vertically downwardly as in a mulching deck. A rotary cutting deck is a side discharge deck where the grass clippings are discharged to one side of the deck while a rear discharge deck is one where the grass clippings are discharged to the rear of or behind the cutting deck. In mowers where a plurality of cutting decks are carried on a traction frame, rear discharge decks are typically preferred over side discharge decks.

Some cutting decks are convertible between mulching and grass discharge modes by virtue of removable or openable covers that can be used to block the grass discharge outlets to place the mower into a mulching mode. In the mulching mode, since the grass discharge outlet is blocked, the grass clippings must necessarily fall out through the open bottom of the cutting deck. The operator can easily convert this cutting deck to a grass discharge mode simply by removing or opening the cover blocking the grass discharge outlet provided in the peripheral wall of the cutting deck. When this is done, the natural horizontal circulation of the grass clippings inside the deck will cause the vast majority of the clippings to pass through the grass discharge outlet instead of falling out through the open bottom of the cutting deck. U.S. Pat. No. 4,226,074 to Mullet et al. shows a cutting deck convertible between a mulching mode, a side discharge mode, and a rear discharge mode.

In the mower shown in the Mullet et al. patent, the rear discharge mode is effected simply by opening a cover that normally blocks a rear discharge opening in each individual cutting chamber of the cutting deck. While this is effective in allowing the grass clippings to exit to the rear of the deck, no particular thought or design was given to effecting an even distribution of grass clippings behind the mower. Thus, in many prior art mowers such as that shown in the Mullet et al. patent, the grass clippings deposited to the rear of the cutting deck will often lie on top of the turf in large clumps or groups. This condition will be particularly present and noticeable when the grass being cut has grown fairly long such that the grass clippings themselves are fairly long and/or when the grass being cut is relatively wet.

There is an increasing tendency in the turf care area for the owners of the site being cut to require a highly finished and groomed look after the grass on the site is cut. In other words, once the mowing operation is completed, the presence of visible grass clippings or clumps of grass clippings on top of the turf is increasingly undesirable, even for mowers whose cutting decks are operating in grass discharge modes. Instead, grass clippings being discharged to the side or rear of a cutting deck are desirably spread out as evenly and as smoothly as possible. Rotary cutting decks which are capable of this are more desirable to the purchasers of such equipment.

SUMMARY OF THE INVENTION

One aspect of this invention relates to a rotary cutting deck for a mower which includes at least one cutting chamber formed by a top wall and a peripheral wall. A rotary cutting blade is carried in the cutting chamber for rotation in the cutting chamber. The cutting blade rotates about a substantially vertical axis in a substantially horizontal cutting plane when the cutting deck and rotary cutting blade are in operation. A grass discharge outlet is provided in the peripheral wall of the cutting chamber for allowing grass clippings to exit from the cutting chamber in a substantially horizontal path. In addition, a ramp is located adjacent at least the peripheral wall of the cutting chamber. The ramp has a progressively increasing depth between a front end and a rear end thereof. The front end of the ramp is ahead of the grass discharge outlet and the rear end of the ramp is located adjacent some portion of the grass discharge outlet.

Another aspect of this invention relates to a rotary cutting deck for a mower which includes at least one cutting chamber formed by a top wall and a peripheral wall. The cutting chamber has two front and two rear quadrants taken with respect to forward motion of the cutting chamber. A rotary cutting blade is carried in the cutting chamber for rotation in the cutting chamber, the cutting blade rotating about a substantially vertical axis in a substantially horizontal cutting plane when the cutting deck and rotary cutting blade are in operation. A grass discharge outlet is provided in the peripheral wall of the cutting chamber with the grass discharge outlet being located in at least one rear quadrant of the cutting chamber for allowing grass clippings to exit to the rear of the cutting chamber in a substantially horizontal path. A ramp extends downwardly from the top wall of the cutting chamber and has a progressively increasing depth between a front end and a rear end thereof. The front end of the ramp is located in a front quadrant of the cutting chamber and the rear end of the ramp is located in a rear quadrant of the cutting chamber. The ramp deflects grass clippings downwardly in the cutting chamber towards the grass discharge outlet.

Yet another aspect of this invention relates to a rotary cutting deck for a mower which includes at least one cutting chamber formed by a top wall and a peripheral wall. A rotary cutting blade is carried in the cutting chamber for rotation in the cutting chamber, the cutting blade rotating about a substantially vertical axis in a substantially horizontal cutting plane when the cutting deck and rotary cutting blade are in operation. A grass discharge outlet is provided in the peripheral wall of the cutting chamber for allowing grass clippings to exit to the rear of the cutting chamber in a substantially horizontal path. A generally vertical vane extends downwardly within the cutting chamber and is angled so as to be non-concentric to the peripheral wall. The vane begins in advance of the grass discharge outlet and ends behind an entrance of the grass discharge outlet taken with respect to the direction of blade rotation.

BRIEF DESCRIPTION OF THE DRAWINGS

This invention will be described hereafter in the Detailed Description, taken in conjunction with the following drawings, in which like reference numerals refer to like elements or parts throughout.

DETAILED DESCRIPTION

Figure 1:
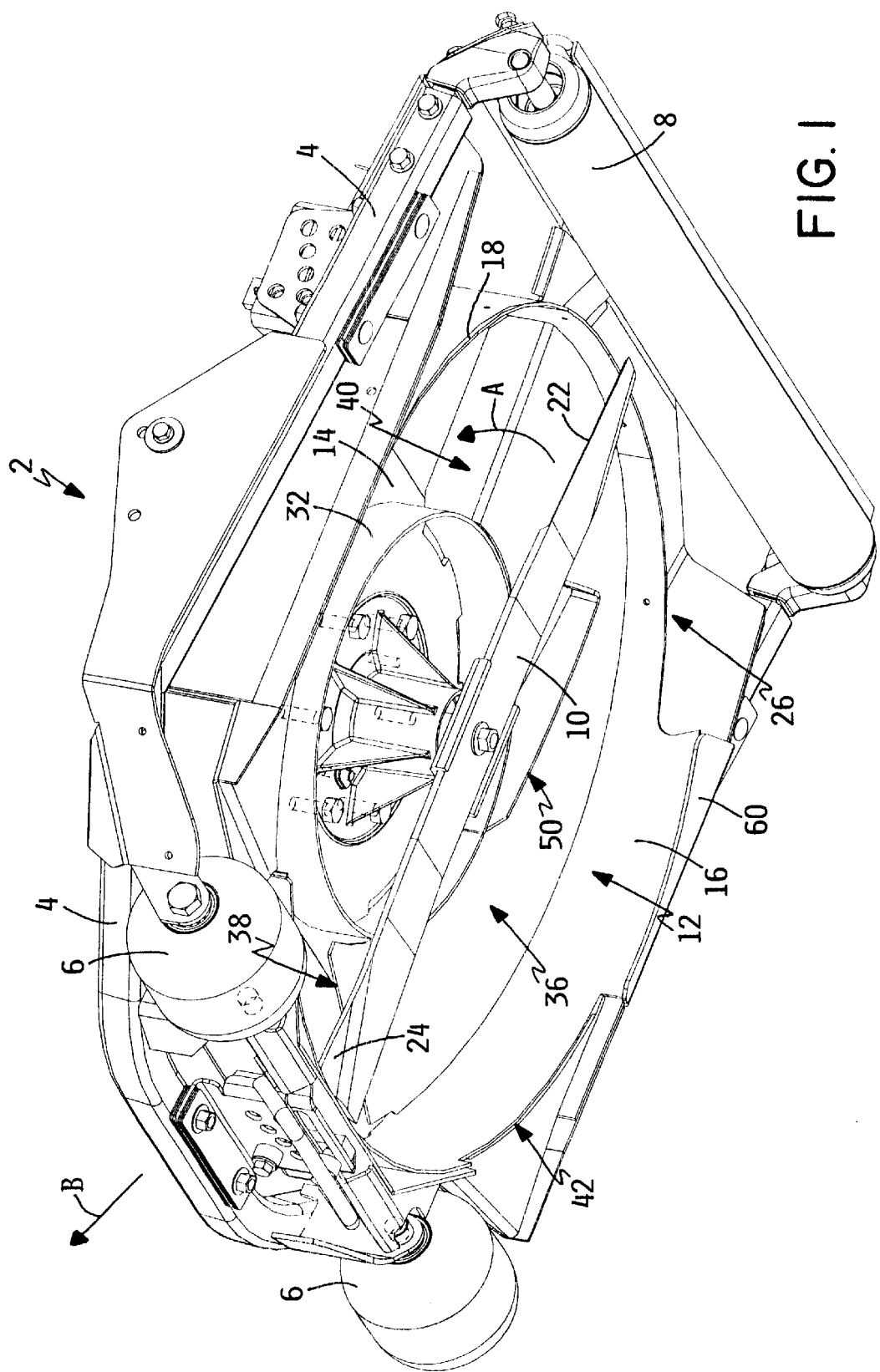
FIG. 1 is a perspective view of a rotary cutting deck according to this invention, particularly illustrating the underside of the cutting deck.

One embodiment of a rotary cutting deck according to this invention is shown in FIGS. 1–5 with the rotary cutting deck being generally illustrated as 2. Cutting deck 2 is of the type that is intended to be attached to a traction frame (not shown) of a mower (not shown) so that cutting deck 2 is propelled over the ground as the mower travels over the ground. One cutting deck 2 or multiple cutting decks 4 may be attached to the mower. Preferably, each cutting deck 2 is attached to the mower in ways that permit each cutting deck 2 to individually follow the contours of the ground when cutting decks 2 are being used to cut grass. The types of suspensions and linkages (not shown) that are used to accomplish such ground following action, and the types of mowers on which cutting decks 2 of this type may be used, are well known in the turf care industry and need not be further described herein.

Cutting deck 2 of this invention has a superstructure or frame 4 on which various elements of cutting deck 2 are carried. For example, frame 4 mounts two laterally spaced apart front rollers 6 and a rear roller 8 which engage the ground during when cutting deck 2 is being used to cut grass. These rollers 6 and 8 allow cutting deck 2 to roll over the surface of the ground with the forward propulsive force for cutting deck 2 coming from the traction frame of the mower through the suspensions and linkages that attach cutting deck 2 to the mower. In addition, cutting deck 2 would typically carry some type of drive motor (not shown), e.g. a hydraulic or electric drive motor, on the top of cutting deck 2, which drive motor is not visible in the figures since cutting deck 2 is tipped up in the figures to show the underside of cutting deck 2. This drive motor is used to rotate a rotary cutting blade 10 that is carried in a cutting chamber 12 that is part of cutting deck 2.

The exact nature of the superstructure or frame 4 of cutting deck 2, or of the types of ground engaging members that support cutting deck 2 for rolling over the ground, or how cutting blade 10 is rotated, are not important to this invention. This invention relates primarily to the structure of cutting chamber 12 and particularly to various elements thereof which promote the even and uniform discharge of grass clippings through a grass discharge outlet. Thus, this invention could be used on cutting decks 2 having various types of superstructures or frames 4, or on cutting decks 2 which might have ground engaging members other than rollers 6 and 8, such as skids, or on cutting decks 2 having no ground engaging members where each cutting deck 2 is simply suspended in some fashion from the traction frame of the mower, or on cutting decks 2 where rotary cutting blades 10 are powered by other than drive motors carried on cutting decks 2, such as by a belt drive taken from a PTO on the mower. Accordingly, the remaining description will focus on those elements of cutting deck 2 to which the present invention is directed in some way.

Cutting deck 2 of this invention carries a cutting chamber 12 that is formed by a top wall 14 of cutting deck 2 and by a generally circular peripheral wall 16 that extends downwardly from top wall 14. Peripheral wall 16 terminates in a lower edge 18 that faces the ground when cutting deck 2 is upright and is being used to cut grass. A steel cutting blade 10 is carried on a drive spindle 20, i.e. on either the drive shaft of the aforementioned drive motor or on a drive spindle of a belt drive or the like. Steel cutting blade 10 thus rotates about a substantially vertical axis, i.e. the axis of drive spindle 20, such that cutting blade 10 rotates in a substantially horizontal cutting plane within cutting chamber 12.

As is typical of most rotary blades 10, the leading edges of the radial outer ends of cutting blade 10 have sharpened cutting edges 22. The trailing edges of the radial outer ends of cutting blade 10 have upturned sails 24 that follow cutting edges 22 of cutting blade 10. As cutting blade 10 rotates in the direction indicated by the arrows A in FIGS. 1 and 2, cutting edges 22 of cutting blade 10 cut the grass and sails 24 generate an airflow in cutting chamber 12 which airflow circulates in the same direction as the direction of rotation of cutting blade 10. The grass clippings which have been created by the cutting action of cutting edges 22 of cutting blade 10 are entrained in this airflow and circulate within cutting chamber 12 until such time as they exit cutting chamber 12.

In cutting deck 2 of this invention, cutting chamber 12 is designed to have a grass discharge mode in which the grass clippings are allowed to exit in a generally horizontal path or direction from cutting chamber 12 so as to be thrown out on top of the ground or turf. More particularly, cutting chamber 12 is designed to discharge the grass clippings to the rear of cutting chamber 12, though they could also be discharged from cutting chamber 12 in some other direction. In addition, cutting chamber 12 is designed to discharge the grass clippings to the rear of cutting chamber 12 in a more uniform and even fashion than other prior art rotary cutting decks.

Figure 6:
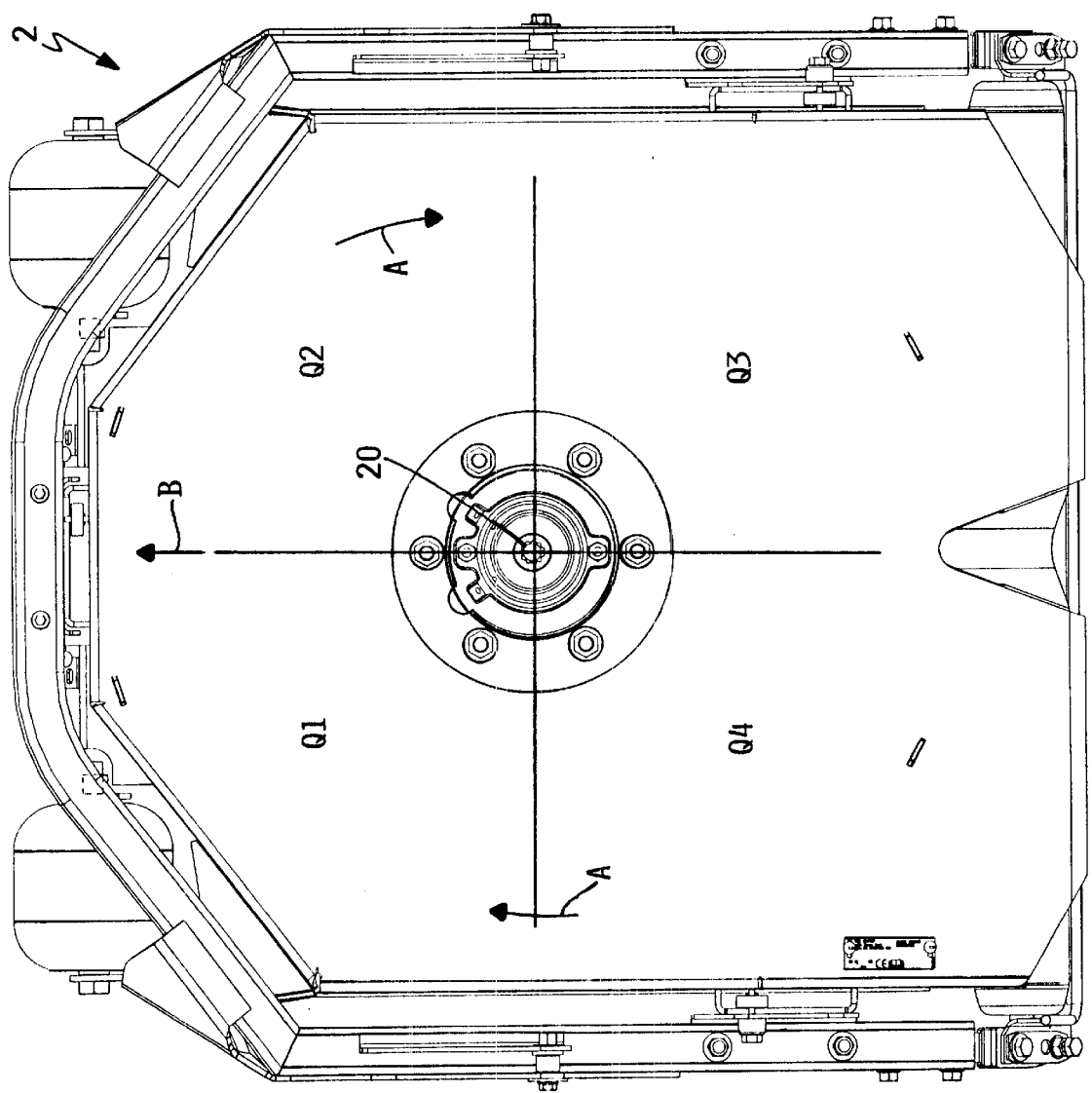
FIG. 6 is a top plan view of the cutting deck showing the four quadrants comprising the cutting chamber and the quadrant designations assigned to these quadrants herein with the cutting deck being upright and looking down on the cutting deck from above, the arrow A in FIG. 6 indicating the direction of blade rotation and the arrow B in FIG. 6 indicating the direction of forward motion of the cutting deck.

In achieving these objectives, cutting deck 2 of this invention includes a rear discharge outlet 26 in cutting chamber 12 to allow the grass clippings to exit to the rear of cutting chamber 12. For reference purposes, cutting chamber 12 can be thought of as having four quadrants, labelled Q1, Q2, Q3 and Q4 in the view of FIG. 6, with quadrant 1 being the left front quadrant, quadrant 2 being the right front quadrant, quadrant 3 being the right rear quadrant, and quadrant 4 being the left rear quadrant. In these quadrant designations, it is assumed that cutting deck 2 is upright and the reference to right and left is made while looking down on cutting deck 2 from above. The reference to front and rear is made with respect to the direction of forward motion of the cutting deck 2 when the mower is moving forwardly as shown by the arrows B in FIGS. 1, 2 and 6. With this reference system in mind and with the direction of rotation of cutting blade 10 as shown by the arrows A in FIGS. 1, 2 and 6, most of the actual cutting of grass by cutting blade 10 takes place in quadrants 1 and 2.

Rear discharge outlet 26 in cutting chamber 12 is located primarily in quadrants 3 and 4, i.e. in the two rear quadrants of cutting chamber 12. Rear discharge outlet 26 is formed by a cut-away portion of peripheral wall 16 of cutting chamber 12. The entrance 28 of rear discharge outlet 26 is formed by a sharp cornered, vertical surface which begins the cut-away portion of peripheral wall 16. The cutaway portion of peripheral wall 16 then extends around quadrant 3 from sharp cornered entrance 28 to a transition point 30 that is located approximately at the end of quadrant 3 or slightly past the end of quadrant 3 and somewhat into quadrant 4. See FIG. 3. Unlike sharp cornered entrance 28, transition point 30 of rear discharge outlet 26 is simply a point at which peripheral wall 16 begins to gradually lengthen again until it regains its normal full height at some point about in the middle of quadrant 4.

Thus, considering rear discharge outlet 26 from its beginning to its end travelling in the direction of rotation of blade 10, one encounters sharp cornered entrance 28, a first section of rear discharge outlet 26 having a substantially constant depth for the cut-away portion with this first section ending at transition point 30, and a second section of rear discharge outlet 26 in which the depth of the cut-away portion progressively lessens until the cutaway portion simply fades away. The placement of the end of rear discharge outlet 26 can vary but is preferably somewhat symmetrically arranged in quadrant 4 to the placement of entrance 28 in quadrant 3. In other words, rear discharge outlet 26 extends across approximately the rear half of quadrant 3 and the front half of quadrant 4 to lie generally adjacent rear roller 8.

The grass clippings tend to circulate naturally within cutting chamber 12 in a path that is adjacent peripheral wall 16 due to centrifugal force. To accentuate this tendency, cutting chamber 12 is provided with an inner, concentric shroud 32 that serves to form an annular or doughnut shaped grass discharge channel 34 between itself and peripheral wall 16. Grass discharge channel 34 has a radial width indicated as w in FIG. 2. The use of inner concentric shroud 32, while not mandatory, is preferred as it cuts down on any inward drift of grass clippings across cutting chamber 12 and reinforces the tendency of the grass clippings to circulate in a confined, annular path by providing an annular grass discharge channel 34 in which the grass clippings naturally move.

A grass deflecting ramp 36 is located in grass discharge channel 34 between inner concentric shroud 34 and peripheral wall 16. Ramp 36 has a front end 38 that is located approximately midway in quadrant 2 of cutting chamber 12 in advance of sharp cornered entrance 28 of rear discharge outlet 26. Front end 38 of ramp 36 lies closely against the underside of top wall 14 with only the thickness of the plate material which forms ramp 36 extending beneath top wall 14. See FIGS. 1 and 5. From front end 38 of ramp 36, ramp 36 progressively lowers within cutting chamber 12, i.e. moves away from top wall 14 of cutting chamber 12 and towards lower edge 18 of peripheral wall 16 of cutting chamber 12, until ramp 36 terminates at a rear end 40.

Figure 2:
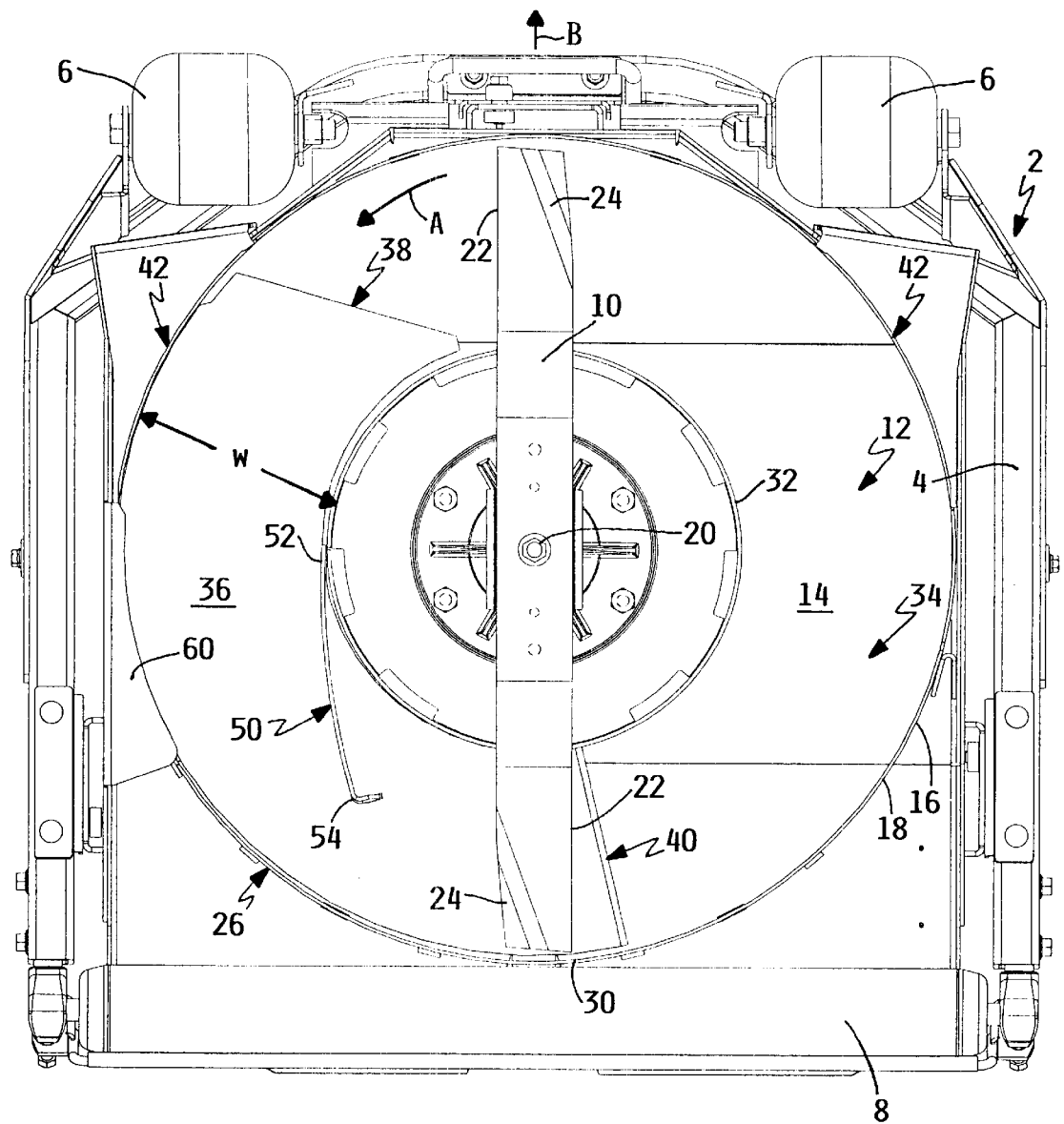
FIG. 2 is a bottom plan view of the rotary cutting deck of FIG. 1.
Figure 3:
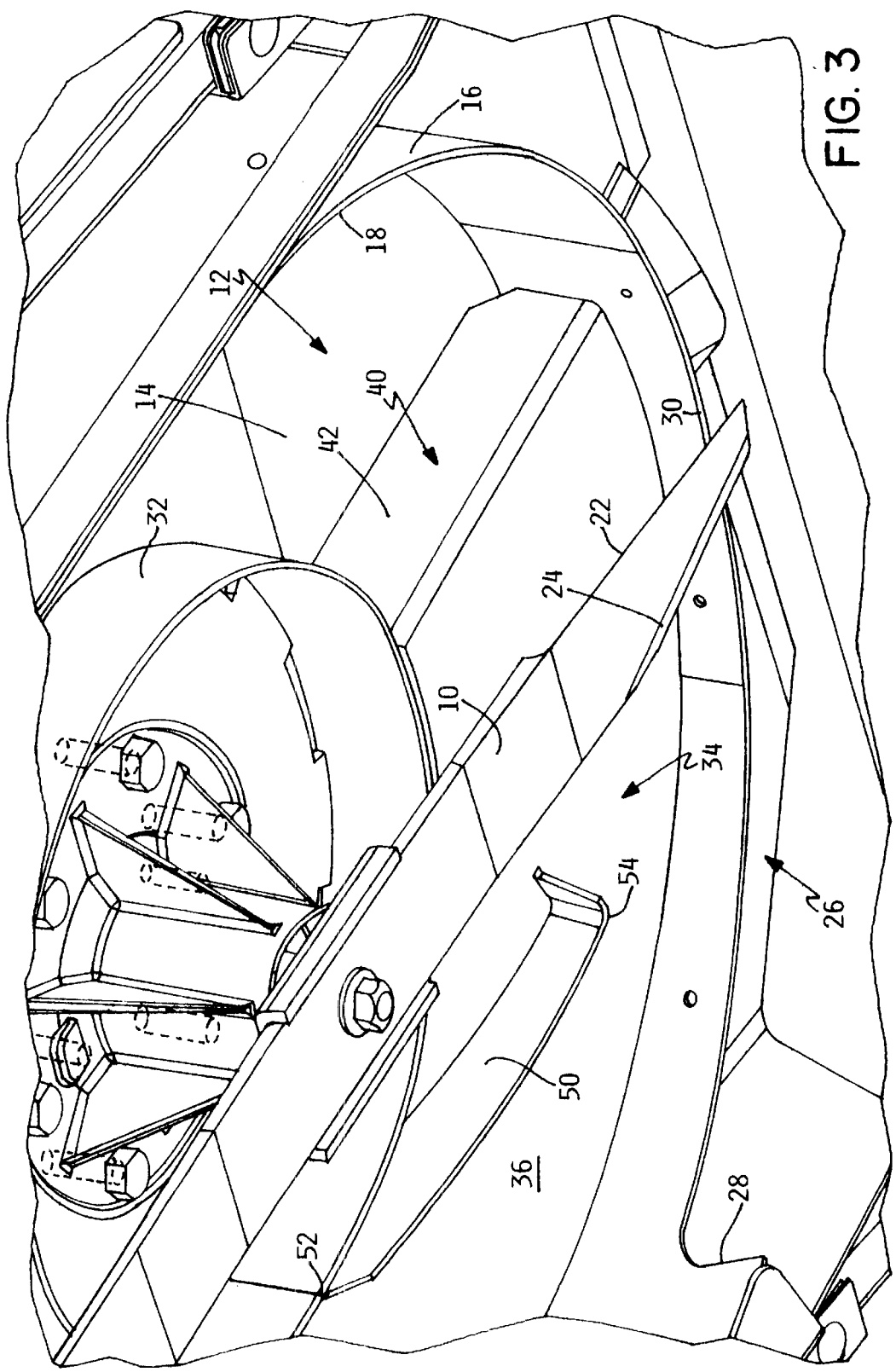
FIG. 3 is an enlarged perspective view of a portion of the rotary cutting deck shown in FIG. 1, particularly illustrating the rear discharge outlet, the rear end of the ramp used to deflect the grass clippings towards the rear discharge outlet and the downwardly extending grass clipping divider vane placed on the ramp.

Referring now to FIGS. 1 and 3, rear end 40 of ramp 36 has dropped slightly more than halfway down the normal full height of peripheral wall 16 of cutting chamber 12 with rear end 40 being still slightly above the cut-away portion forming rear discharge outlet 26. In addition, rear end 40 of ramp 36 is located again approximately at the end of quadrant 2 or slightly into quadrant 3. As shown in FIG. 3, rear end 40 of ramp 36 is a few inches past transition point 30 of rear discharge outlet 26 where the cut-away portion begins to taper upwardly. Also as shown in FIG. 3, rear end 40 of ramp 36 includes a vertical surface 42 that extends back upwardly to top wall 14 of cutting chamber 12 so that rear end 40 of ramp 36 is not open, but is closed. Thus, grass clippings cannot collect beneath rear end 40 of ramp 36. In addition, ramp 36 desirably extends across the entire width w of grass discharge channel 34 to abut against both inner concentric shroud 32 and peripheral wall 16 to prevent grass clippings from wedging or packing between the sides of ramp 36 and shroud 32 or peripheral wall 16. See FIG. 2.

Grass discharge outlet 26 is sufficiently deep that the tips or radial outer ends of cutting blade 10 become exposed over most of the length of grass discharge outlet 26. the tips of blade 10 similarly are exposed in front cut-outs 44 on each side of cutting deck 2. However, front cut-outs 44 form no part of this invention, but are the subject, inter alia, of a copending U.S. patent application, namely Ser. No. 09/489,180.

The Applicants have found that the combination of a rear discharge outlet 26 with a grass deflecting ramp 36 allows for an efficient and smooth discharge of grass clippings from cutting chamber 12. The use of a ramp 36 is better than simply allowing grass clippings to flow through an open rear outlet as ramp 36 directs the grass clippings more smoothly to and through rear discharge outlet 26. This would, of course, also be true with a side discharge outlet instead of a rear discharge outlet 26. A ramp 36 whose front end 38 is in advance of the entrance to the discharge outlet and whose rear end 40 is located somewhere approximately at least in the middle of the discharge outlet seems to promote a better and more even flow of grass clippings through the discharge outlet, whether that discharge outlet points to the rear of cutting deck 2 or in some other direction.

In some grass conditions, the Applicants have noticed that the discharge of grass clippings was heavier in the middle of the grass clipping discharge swath. To prevent this and to better even out the side-to-side distribution of grass clippings across the width of the grass clipping discharge swath, the Applicants placed a downwardly extending, grass clippings guide or divider vane 50 on ramp 36.

Referring now to FIG. 2, vane 50 is located between inner concentric shroud 32 and peripheral wall 16 of cutting chamber 12. Vane 50 begins, as shown at 52, approximately at the beginning of quadrant 3 somewhat in advance of entrance 28 to rear discharge outlet 26 and somewhat behind front end 38 of ramp 36. Vane 50 ends, as shown at 54, in the middle of quadrant 3 behind entrance 28 to rear discharge outlet 26 but in front of rear end 40 of ramp 36. Vane 50 is not concentric to inner concentric shroud 32 or peripheral wall 16, but angles across ramp 36 from inner concentric shroud 32 towards peripheral wall 16. The end of vane 50 does not extend all the way to peripheral wall 16 or to rear discharge outlet 26 therein, but terminates about halfway across the width of ramp 36.

The Applicants found that with the use of vane 50, the tendency of the grass clippings to be deposited more heavily in the middle of the clipping discharge swath was minimized. In other words, the grass clippings were more evenly distributed from side to side in the swath in which they are deposited behind cutting deck 2. Precisely why this is true is somewhat uncertain, though Applicants believe that vane 50 forms a barrier that forces some clippings to be discharged closer to entrance 28 of rear discharge outlet 26 than would otherwise be true.

While use of vane 50 is preferred in promoting a more even side-to-side distribution of grass clippings, ramp 36 and rear discharge outlet 26 could obviously be used, and would have benefits over the prior art, without also using vane 50 thereon. In addition, a vane 50 used in an annular grass discharge channel 34 in a cutting chamber 12 with vane 50 beginning in advance of a grass discharge outlet and pointing towards outlet 26 would have benefits in promoting a more even side-to-side distribution even if it were not used on the underside of a grass deflecting ramp 36. Accordingly, ramp 36 and vane 50 could be used separately from one another, though desirably they are used together.

Figure 4:
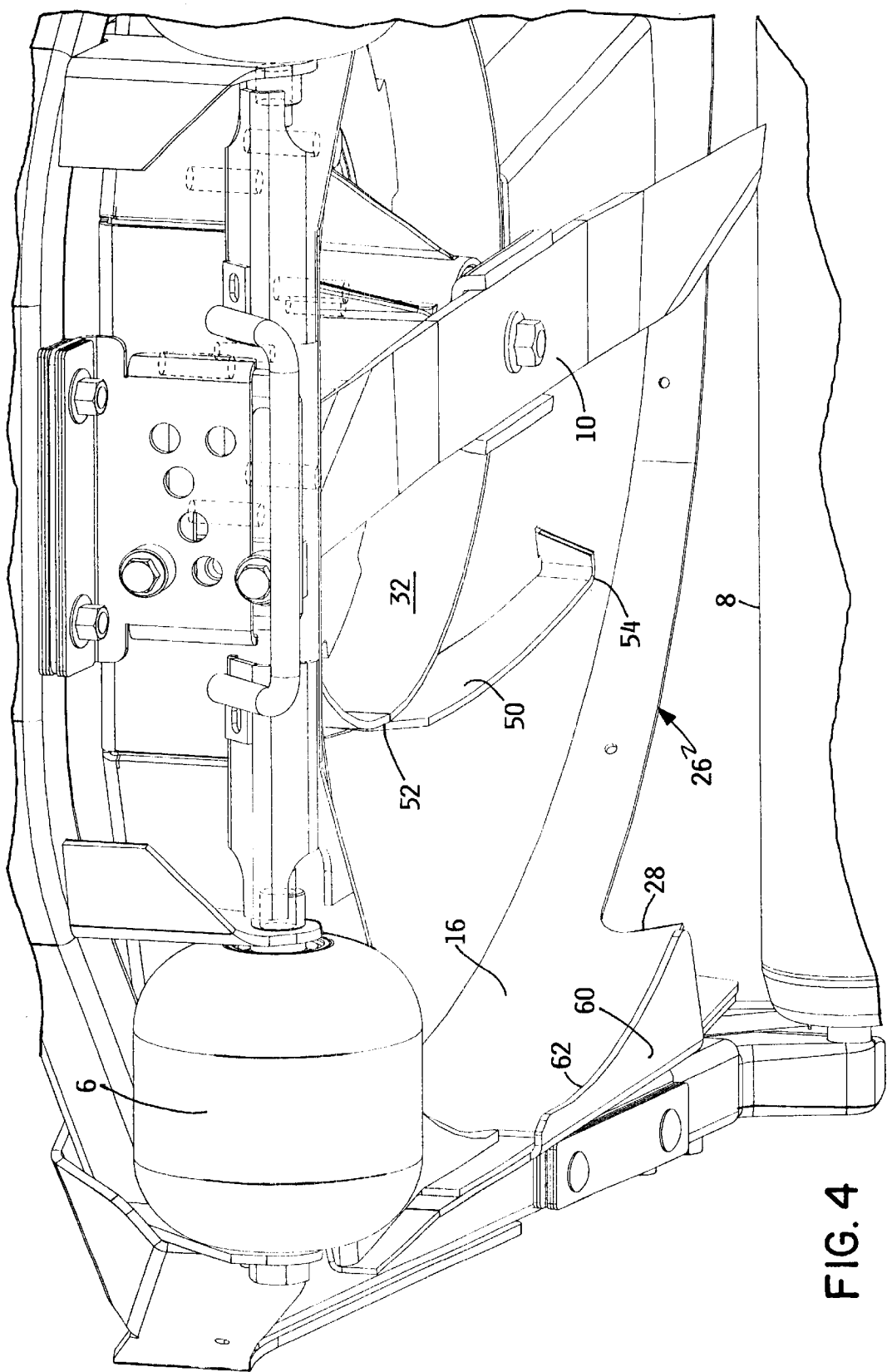
FIG. 4 is an enlarged perspective view of a portion of the rotary cutting deck shown in FIG. 1, particularly illustrating the baffle placed on the lower edge of the peripheral wall of the cutting chamber in advance of the rear discharge outlet for helping minimize dribbling or streaking of grass clippings along the side of the cutting deck.
Figure 5:
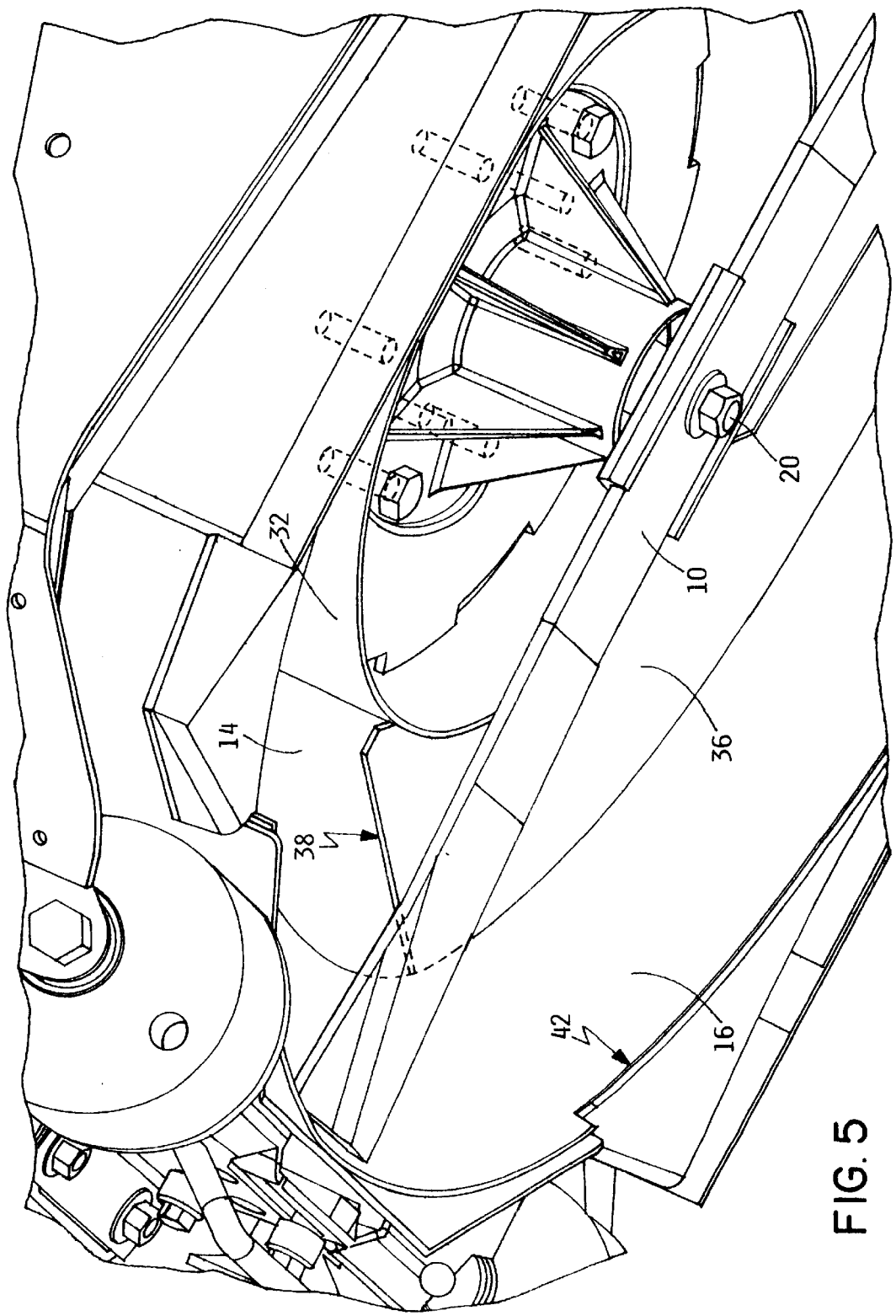
FIG. 5 is an enlarged perspective view of a portion of the rotary cutting deck shown in FIG. 1, particularly illustrating the front end of the ramp used to deflect the grass clippings towards the rear discharge outlet.

Finally, in certain grass conditions, the Applicants also noticed a tendency for grass clippings to dribble out or be deposited in a streak along the side of cutting chamber 12. To prevent or minimize this from occurring, the Applicants added a horizontal baffle 60 on lower edge 18 of peripheral wall 16 of cutting chamber 12 in advance of entrance 28 to rear discharge outlet 26 but again behind front end 38 of ramp 36. Referring to FIG. 2, baffle 60 extends across the junction between quadrants 2 and 3 with a portion of baffle 60 lying at the very rear of quadrant 2 and a somewhat larger portion of baffle 60 lying at the front of quadrant 3. As shown in FIG. 4, baffle 60 has a radially innermost lip 62 that extends slightly over lower edge 18 of peripheral wall 16 to protrude somewhat radially inwardly into annular grass discharge channel 34.

The Applicants found that such a baffle 60 with its radially inwardly protruding lip 62 minimized any grass dribbling or streaking along the side of cutting chamber 12. Again, while use of baffle 60 is preferred for this reason, it is not strictly necessary to the use of the other elements of this invention. Baffle 60 could be deleted if so desired.

Various modifications of this invention will be apparent to this skilled in the art. The description of one embodiment of a rotary cutting deck 2 according to this invention is not meant to state or imply that this is the only cutting deck 2 that could be made embodying this invention. For example, the length and placement of ramp 36 could vary as well as the depth of ramp 36 at its rear end 40. The length, shape and placement of discharge outlet 26 could vary. The length and orientation of vane 50 could vary. The amount of overlap of baffle 60 on lower edge 18 of peripheral wall 16 could vary. Vane 50 and baffle 60 need not necessarily be used with each other or with ramp 36.

In addition, cutting deck 2 could be made such that rear discharge outlet 26 is always open or, alternatively, rear discharge outlet 26 could be selectively closed by some type of cover to convert cutting deck 2 from a grass discharge to a mulching mode. This invention relates to either type of cutting deck 2, i.e. one which is solely a grass discharge deck or one which is convertible between grass discharge and mulching modes. Thus, the scope of this invention is to be limited only by the appended claims.

We claim:

1. A rotary cutting deck for a mower, which comprises:
   (a) at least one cutting chamber formed by a top wall and a peripheral wall having a lower edge;
   (b) a rotary cutting blade carried in the cutting chamber for rotation in the cutting chamber, the cutting blade rotating about a substantially vertical axis in a substantially horizontal cutting plane when the cutting deck and rotary cutting blade are in operation;
   (c) a grass discharge outlet in the peripheral wall of the cutting chamber adjacent the lower edge of the peripheral wall for allowing grass clippings to exit from the cutting chamber in a substantially horizontal path; and
   (d) a ramp located adjacent at least the peripheral wall of the cutting chamber, wherein the ramp has a progressively increasing depth between a front end and a rear end thereof such that the ramp progressively moves away from the top wall and towards the lower edge of the peripheral wall as the ramp extends between the front and rear ends thereof such that grass clippings travelling within the cutting chamber and engaging the front end of the ramp will be progressively forced downwardly by the ramp away from the top wall towards the grass discharge outlet adjacent the lower edge of the peripheral wall, wherein the front end of the ramp is ahead of the grass discharge outlet and rear end of the ramp is located adjacent some portion of the grass discharge outlet.

2. The rotary cutting deck of claim 1, wherein the cutting chamber further includes an inner shroud that is located concentrically inside of the peripheral wall to form an annular grass discharge channel between the inner shroud and the peripheral wall, and wherein the ramp is located in the annular grass discharge channel.

3. The rotary cutting deck of claim 2, wherein the grass discharge channel has a width measured by the distance between the inner shroud and peripheral wall along a radial line extending outwardly from a center of the cutting chamber, and wherein the ramp spans across substantially the entire width of the grass discharge channel.

4. The rotary cutting deck of claim 1, wherein the cutting chamber has quadrants 1–4 with quadrants 1 and 2 being front quadrants and quadrants 3 and 4 being rear quadrants taken with respect to forward movement of the cutting chamber, the cutting blade rotating progressively through quadrants 1–4 during one complete cycle of rotation, and wherein the discharge outlet has an entrance located within the quadrant 3 and an exit located in quadrant 4 such that grass clippings are discharged through the discharge outlet towards the rear of the cutting deck.

5. The rotary cutting deck of claim 4, wherein the front end of the ramp is located in quadrant 2.

6. The rotary cutting deck of claim 5, wherein the rear end of the ramp is located approximately at the end of quadrant 3 or in the beginning of quadrant 4.

7. The rotary cutting deck of claim 6, wherein the depth of the ramp at the rear end of the ramp is approximately half the cutting chamber's depth.

8. The rotary cutting deck of claim 6, wherein the depth of the ramp at the rear end of the ramp is such that the rear end of the ramp is located slightly above the grass discharge outlet.

9. The rotary cutting deck of claim 1, wherein the grass discharge outlet is along a rear side of the cutting deck.

10. The rotary cutting deck of claim 9, wherein the grass discharge outlet is a cut-away portion of the peripheral wall.

11. The rotary cutting deck of claim 10, wherein the cut-away portion of the peripheral wall forming the grass discharge outlet has a sharp cornered entrance leading to a first section of generally constant depth and a second section of progressively decreasing depth such that the cut-away portion gradually fades away over the second section thereof until the peripheral wall is restored to its full height.

12. The rotary cutting deck of claim 1, further including at least one generally vertical vane extending downwardly from the ramp.

13. The rotary cutting deck of claim 12, wherein the vane begins behind the front end of the ramp and ends in advance of the rear end of the ramp.

14. The rotary cutting deck of claim 13, wherein the vane ends at a rear end that points towards an intermediate portion of the grass discharge outlet but is spaced from the grass discharge outlet.

15. The rotary cutting deck of claim 14, wherein the cutting chamber further includes an inner shroud that is located concentrically inside of the peripheral wall to form an annular grass discharge channel between the inner shroud and the peripheral wall, and wherein the ramp is located in the annular grass discharge channel.

16. The rotary cutting deck of claim 15, wherein the vane begins at the inner shroud slightly in advance of the grass discharge outlet and angles across the grass discharge channel so as to be non-concentric with the inner shroud and the peripheral wall.

17. The rotary cutting deck of claim 12, further including a baffle located on a lower edge of the peripheral wall substantially immediately in advance of the grass discharge outlet, wherein the baffle has a radially inner lip that protrudes radially inwardly over the lower edge of the peripheral wall.

18. The rotary cutting deck of claim 1, further including a baffle located on a lower edge of the peripheral wall substantially immediately in advance of the grass discharge outlet, wherein the baffle has a radially inner lip that protrudes radially inwardly over the lower edge of the peripheral wall.

19. A rotary cutting deck for a mower, which comprises:

(a) at least one cutting chamber formed by a top wall and a peripheral wall, the cutting chamber having two front and two rear quadrants taken with respect to forward motion of the cutting chamber;

(b) a rotary cutting blade carried in the cutting chamber for rotation in the cutting chamber, the cutting blade rotating about a substantially vertical axis in a substantially horizontal cutting plane when the cutting deck and rotary cutting blade are in operation;

(c) a grass discharge outlet in the peripheral wall of the cutting chamber with the grass discharge outlet being located in at least one rear quadrant of the cutting chamber for allowing grass clippings to exit to the rear of the cutting chamber in a substantially horizontal path;

(d) a ramp extending downwardly from the top wall of the cutting chamber and having a progressively increasing depth between a front end and a rear end thereof, wherein the front end of the ramp is located in a front quadrant of the cutting chamber and the rear end of the ramp is located in a rear quadrant of the cutting chamber, the ramp deflecting grass clippings downwardly in the cutting chamber towards the grass discharge outlet.

20. A rotary cutting deck for a mower, which comprises:

(a) at least one cutting chamber formed by a top wall and a peripheral wall;

(b) a rotary cutting blade carried in the cutting chamber for rotation in the cutting chamber, the cutting blade rotating about a substantially vertical axis in a substantially horizontal cutting plane when the cutting deck and rotary cutting blade are in operation;

(c) a grass discharge outlet in the peripheral wall of the cutting chamber for allowing grass clippings to exit to the rear of the cutting chamber in a substantially horizontal path; and (d) a generally vertical divider vane extending downwardly within the cutting chamber and angled so as to be non-concentric to the peripheral wall, the divider vane beginning in advance of the grass discharge outlet and ending behind an entrance of the grass discharge outlet taken with respect to the direction of blade rotation.

21. A rotary cutting deck for a mower, which comprises:

(a) at least one cutting chamber, the cutting chamber including an outer circular peripheral wall forming an outer boundary of the cutting chamber;

(b) an inner concentric shroud located radially inside the peripheral wall to form an annular grass discharge channel between the inner concentric shroud and the peripheral wall;

(c) a rotary cutting blade carried in the cutting chamber for rotation in the cutting chamber, the cutting blade rotating about a substantially vertical axis in a substantially horizontal cutting plane when the cutting deck and rotary cutting blade are in operation, the cutting blade having sharpened cutting edges for severing grass and airflow generating sails for causing grass clippings to circulate within the annular grass discharge channel, both the sharpened cutting edges and sails of the cutting blade overlying the grass discharge channel;

(d) a rear grass discharge outlet formed by a cut-away portion of the lower edge of the peripheral wall of the cutting chamber, the rear grass discharge outlet being located in at least one rear quadrant of the cutting chamber, the rear grass discharge outlet opening into the annular grass discharge channel to permit grass clippings to exit from the grass discharge channel through the rear grass discharge outlet in a generally horizontal path; and (e) a grass deflecting ramp located within the annular grass discharge channel with a front end of the ramp located in advance of an entrance to the rear grass discharge outlet and a rear end of the ramp located in one of the rear quadrants of the cutting chamber to be adjacent some portion of the rear grass discharge outlet, the grass deflecting ramp progressively lowering between its front and rear ends to deflect grass clippings generally downwardly towards the rear discharge outlet, the ramp having a width that spans substantially all the way across the grass discharge channel between the inner concentric shroud and the peripheral wall.

* * * * *

UNITED STATES PATENT AND TRADEMARK OFFICE
CERTIFICATE OF CORRECTION

PATENT NO.    : 6,470,663 B2
DATED         : October 29, 2002
INVENTOR(S)   : Thomas F. Langworthy et al.

It is certified that error appears in the above-identified patent and that said Letters Patent is hereby corrected as shown below:

<u>Column 8,</u>
Line 59, before "rear end" insert -- the --

Signed and Sealed this

Fourth Day of March, 2003

JAMES E. ROGAN
*Director of the United States Patent and Trademark Office*

UNITED STATES PATENT AND TRADEMARK OFFICE
CERTIFICATE OF CORRECTION

PATENT NO.     : 6,470,663 B2
DATED          : October 29, 2002
INVENTOR(S)    : Thomas F. Langworthy et al.

It is certified that error appears in the above-identified patent and that said Letters Patent is hereby corrected as shown below:

<u>Title page,</u>
Item [75], Inventors, add -- Benjamin A. Street, Northfield, MN (US) --

Signed and Sealed this

Sixth Day of May, 2003

JAMES E. ROGAN
*Director of the United States Patent and Trademark Office*